United States Patent
Charbit

(10) Patent No.: US 7,885,315 B2
(45) Date of Patent: Feb. 8, 2011

(54) PILOT SCRAMBLING IN COMMUNICATIONS SYSTEMS

(75) Inventor: Gilles Charbit, Epsom (GB)

(73) Assignee: Nokia Corporation, Espoo (FI)

( * ) Notice: Subject to any disclaimer, the term of this patent is extended or adjusted under 35 U.S.C. 154(b) by 939 days.

(21) Appl. No.: 11/652,377

(22) Filed: Jan. 10, 2007

(65) Prior Publication Data

US 2007/0160118 A1 Jul. 12, 2007

Related U.S. Application Data

(60) Provisional application No. 60/758,875, filed on Jan. 12, 2006.

(51) Int. Cl.
*H04B 1/00* (2006.01)
(52) U.S. Cl. .................................... 375/145
(58) Field of Classification Search ............... 375/142, 375/143, 150, 152, 343, 140, 146, 147, 260; 704/216, 218, 237, 263; 708/5, 422, 813; 342/108, 145, 189, 378
See application file for complete search history.

(56) References Cited

U.S. PATENT DOCUMENTS

| | | | |
|---|---|---|---|
| 6,438,379 | B1 | 8/2002 | Gitlin et al. |
| 6,999,467 | B2 | 2/2006 | Krauss et al. |
| 7,474,688 | B2 * | 1/2009 | McDonough et al. ....... 375/147 |
| 2004/0136336 | A1 | 7/2004 | Nakamura et al. |
| 2005/0079848 | A1 * | 4/2005 | Aromaa et al. .............. 455/296 |
| 2005/0147025 | A1 * | 7/2005 | Auer .......................... 370/203 |
| 2006/0227891 | A1 * | 10/2006 | Niu et al. .................... 375/267 |

FOREIGN PATENT DOCUMENTS

| | | |
|---|---|---|
| WO | WO03085855 | 10/2003 |
| WO | 2005013530 A2 | 2/2005 |

OTHER PUBLICATIONS

TSG-RAN WG1 Ad Hoc on LTE, Sophia Antipolis, France, Jun. 20-21, 2005, R1-050622.
TSG-RAN WG1 #42bis , R1-051147, San Diego, USA, Oct. 10-14, 2005.
3GPP TSG RAN WG1 #42 on LTE, R1-050704, London, UK, Aug. 29-Sep. 2, 2005.
Downlink Synchronization Channel Schemes for E-UTRA, Texas Instruments, R1-051057, 3GPP TSG RAN WG1#42bis, San Diego, USA, Oct. 10-14, 2005.
3GPP TSG RAN WG1#42bis, San Diego, USA, Oct. 10-14, 2005, R1-051057.
3GPP TSG RAN WG1 Meeting #43, R1-051412, Seoul, Korea, Nov. 7-11, 2005.

(Continued)

*Primary Examiner*—Sam K Ahn

(57) ABSTRACT

The specification and drawings present a new method, system, apparatus and software product for pilot scrambling using a scrambling code (e.g., pseudo-noise code such as a Gold code, a Kasami code, a Hadamard code, m-sequences, etc.) in communication systems, e.g., for wireless communications. The sector/cell specific scrambling codes are mapped to the multiple pilot symbols within, e.g., an SCH (synchronization channel) repetition period. This improves receiver performance on a sector edge and/or a cell edge in, e.g., tight-frequency re-use applications.

23 Claims, 4 Drawing Sheets

OTHER PUBLICATIONS

Crosscorrelation Properties of Pseudorandom and Related Sequences, Dilip V. Sarwate, Senior Member, IEEE and Michael B. Pursley, Senior Member, IEEE, vol. 68, No. 5, May 1980.

U.S. Appl. No. 60/731,255, filed Oct. 31, 2005, Gilles Charbit, et al.

3GGP TS 25.211 V4.5.0 (Jun. 2002) Physical channels and mapping of transport channels onto physical channels (FDD) (Release 4).

Scrambling Techniques for CDMA Communications, Byeong Gi Lee, Hingham, MA, USA, 2001.

Korean Office Action mailed Apr. 29, 2010 in corresponding Korean Patent Application No. 10-2008-7015933 (5 pages) and English translation thereof (5 pages).

* cited by examiner

PILOT SCRAMBLING IN COMMUNICATIONS SYSTEMS

PRIORITY AND CROSS REFERENCE TO RELATED APPLICATION

This application claims priority from U.S. Provisional Application Ser. No. 60/758,875 filed on Jan. 12, 2006.

TECHNICAL FIELD

This invention generally relates to communications and more specifically to pilot scrambling in communication systems, e.g., wireless/mobile communication systems.

BACKGROUND ART

Orthogonal Frequency Division Multiplexing (OFDM) has been proposed by Nokia and other companies in 3GPP (3d Generation Partnership Project) for Downlink (DL) Long Term Evolution (LTE) Universal Terrestrial Radio Access Network (UTRAN), see "Principle for the evolved UTRA radio access concept", Alcatel, Ericsson, Fujitsu, LGE, Motorola, NEC, Nokia, NTT DoCoMo, Panasonic, RITT, Samsung, Siemens, WG1 Ad Hoc on LTE UTRA, R1-050622, 3GPP #41bis, Sopia Antipolis, 20-21 June.

NTT DoCoMo proposed a control channel and synchronization channel for scalable bandwidth with two-dimensional (frequency-time) scrambling in Evolved UTRA Downlink, see "Basic structure of control channel and synchronization channel for scalable bandwidth in evolved UTRA downlink", NTT DoCoMo, R1-051147, 3GPP #42bis, San Diego, Oct. 10-14 2005, and [3] "Orthogonal common pilots channel and scrambling code in evolved UTRA downlink", NTT DoCoMo, R1-050704, 3GPP #42, London, September 2005.

Performance of detection algorithms for SSCH (Secondary Synchronization Channel) and system information mapping to SSCH was presented by Texas Instruments in 3GPP, see "Downlink synchronization channel schemes for E-UTRA", TI, R1-051057, 3GPP #42bis, San Diego, Oct. 10-14 2005.

DISCLOSURE OF THE INVENTION

According to a first aspect of the invention, a method, comprises: providing a pseudo-noise scrambling code chosen to provide predetermined cross-correlation and auto-correlation properties; mapping the pseudo-noise scrambling code to multiple pilot symbols and sending a communication signal comprising the multiple pilot symbols coded with the pseudo-noise scrambling code; and receiving the communication signal and decoding the multiple pilot symbols using the pseudo-noise scrambling code for pilot scrambling in a communication system.

According further to the first aspect of the invention, each sub-frame of the communication signal may comprise at least one pilot symbol coded with the pseudo-noise scrambling code.

Further according to the first aspect of the invention, each sub-frame of the communication signal may comprise two pilot symbols coded with the pseudo-noise scrambling code.

Still further according to the first aspect of the invention, the pseudo-noise scrambling code may be a Gold scrambling code. Still further, the Gold sequence of the Gold scrambling code may have a length of 63 or 127.

According still further to the first aspect of the invention, the pseudo-noise scrambling code may be one of: a Kasami code, a Hadamard code, computer-generated random sequences and m-sequences.

According further still to the first aspect of the invention, the pseudo-noise scrambling code may be provided only for the multiple pilot symbols and not for any other symbols in the communication signal.

According yet further still to the first aspect of the invention, the communication signal may be sent downlink from a network element to a user equipment or to a mobile station in a wireless communication system.

Yet still further according to the first aspect of the invention, the communication signal may be sent uplink from a user equipment or a mobile station to a network element in a wireless communication system.

According to a second aspect of the invention, a computer program product comprises: a computer readable storage structure embodying computer program code thereon for execution by a computer processor with the computer program code, wherein the computer program code comprises instructions for performing the first aspect of the invention, indicated as being performed by any component or a combination of components of the communication system.

According to a third aspect of the invention, an apparatus, comprises: a PN code generator, for providing a PN code signal comprising a pseudo-noise scrambling code chosen to provide predetermined cross-correlation and auto-correlation properties; and a signal generating/synchronizing/coding/transmitting module, for mapping the pseudo-noise scrambling code to multiple pilot symbols and sending a communication signal comprising the multiple pilot symbols coded with the pseudo-noise scrambling code to a receiver, wherein the receiver is configured for receiving the communication signal and decoding the multiple pilot symbols using the pseudo-noise scrambling code.

According further to the third aspect of the invention, the apparatus may be a Node B and the receiver is a user equipment configured for wireless communications, wherein the communication signal is sent downlink.

Further according to the third aspect of the invention, the apparatus may be a user equipment and the receiver is a Node B configured for wireless communications, wherein the communication signal is sent uplink.

Still further according to the third aspect of the invention, each sub-frame of the communication signal may comprise at least one pilot symbol coded with the pseudo-noise scrambling code.

According further to the third aspect of the invention, each sub-frame of the communication signal may comprise two coded pilot symbols coded with the pseudo-noise scrambling code.

According still further to the third aspect of the invention, the pseudo-noise scrambling code may be a Gold scrambling code. Still further, the Gold sequence of the Gold scrambling code may have a length of 63 or 127.

According yet further still to the third aspect of the invention, the pseudo-noise scrambling code may be one of: a Kasami code, a Hadamard code, computer-generated random sequences and m-sequences.

According further still to the third aspect of the invention, the pseudo-noise scrambling code may be provided only for the multiple pilot symbols and not for any other symbols in the communication signal.

Yet still further according to the third aspect of the invention, an integrated circuit may comprise the PN code generator and the signal generating/synchronizing/coding/transmitting module.

According to a fourth aspect of the invention, a communication system, comprises: a transmitter, for providing a pseudo-noise scrambling code chosen to provide predetermined cross-correlation and auto-correlation properties, for mapping the pseudo-noise scrambling code to multiple pilot symbols and sending a communication signal comprising the multiple pilot symbols coded with the pseudo-noise scrambling code; and a receiver for receiving the communication signal and decoding the multiple pilot symbols using the pseudo-noise scrambling code for pilot scrambling in the communication system.

According further to the fourth aspect of the invention, the transmitter may be a Node B and the receiver is a user equipment configured for wireless communications, wherein the communication signal is sent downlink.

Further according to the fourth aspect of the invention, the transmitter may be a user equipment and the receiver is a Node B configured for wireless communications, wherein the communication signal is sent uplink.

Still further according to the fourth aspect of the invention, each sub-frame of the communication signal may comprise at least one coded pilot symbol coded with the pseudo-noise scrambling code.

According further to the fourth aspect of the invention, each sub-frame of the communication signal may comprise two coded pilot symbols coded with the pseudo-noise scrambling code.

According still further to the fourth aspect of the invention, the pseudo-noise scrambling code may be one of: a Gold code, a Kasami code, a Hadamard code, computer-generated random sequences and m-sequences.

According further still to the fourth aspect of the invention, the pseudo-noise scrambling code may be provided only for the multiple pilot symbols and not for any other symbols in the communication signal.

According to a fifth aspect of the invention, a receiver, comprises: a signal receiving/synchronizing/decoding module, for receiving and decoding a communication signal comprising the multiple pilot symbols using a pseudo-noise scrambling code, wherein the multiple pilot symbols are coded using a PN code signal comprising the pseudo-noise scrambling code chosen to provide predetermined cross-correlation and auto-correlation properties by a transmitter and the pseudo-noise scrambling code is further mapped to the multiple pilot symbols by the transmitter for providing the communication signal to the receiver.

According further to the fifth aspect of the invention, the pseudo-noise scrambling code may be one of: a Gold code, a Kasami code, a Hadamard code, computer-generated random sequences and m-sequences.

Further according to the fifth aspect of the invention, an integrated circuit may comprise the signal receiving/synchronizing/decoding module.

According to a sixth aspect of the invention, an apparatus, comprises: generating means, for providing a PN code signal comprising a pseudo-noise scrambling code chosen to provide predetermined cross-correlation and auto-correlation properties; and transmitting means, for mapping the pseudo-noise scrambling code to multiple pilot symbols and sending a communication signal comprising the multiple pilot symbols coded with the pseudo-noise scrambling code to a receiver, wherein the receiver is configured for receiving the communication signal and decoding the multiple pilot symbols using the pseudo-noise scrambling code.

According further to the sixth aspect of the invention, the generating means may be a PN code generator, and the transmitting means may be a signal generating/synchronizing/coding/transmitting module.

BRIEF DESCRIPTION OF THE DRAWINGS

For a better understanding of various embodiments of the present invention, reference is made to the following detailed description taken in conjunction with the following drawings, in which.

MODES FOR CARRYING OUT THE INVENTION

A new method, system, apparatus and software product are presented for pilot scrambling using a scrambling code in communication systems, e.g., wireless/mobile communication systems. According to embodiment of the present invention, sector/cell specific scrambling codes are mapped to the multiple pilot symbols within, e.g., an SCH (synchronization channel) repetition period. This improves receiver performance on a sector edge and/or a cell edge in, e.g., tight-frequency re-use applications. Further, according to embodiments of the present invention, the scrambling code can be used for the multiple pilot symbols and other symbols used for communications in the mobile communication system, but alternatively the scrambling code can be only used for the multiple pilot symbols and not for any other symbols used for the communications in the wireless/mobile communication systems. Various embodiments of the present invention focus on randomization of pilots needed for allowing channel estimation for receiver detection to be used in evolving technologies like 3.9G, 4G, etc. Also the method can be applied to a downlink (DL) or an uplink (UP).

According to the embodiment of the present invention, the sampling code can be pseudo-noise (PN) scrambling code, e.g., a Gold code, a Kasami code, a Hadamard code, computer-generated random sequences, m-sequences, etc. The particular code is chosen to provide predetermined cross-correlation and auto-correlation properties.

Gold sequences (or Gold codes) have large sequence sets with near optimum cross-correlation properties, e.g., see S. Sarwate, M. Pursley, "Crosscorrelation properties of pseudo-random and related sequences", IEEE Proceedings, Vol. 68, May 1980. Kasami sequences may have even better cross-correlation properties but suffer from a relatively small sequence set. A Gold sequence set with a length $N_c=2^L-1$, i.e., sequences of length $2^L-1$ (L is an integer, L>1) is generated from a pair of preferred m-sequences.

Figure 1:
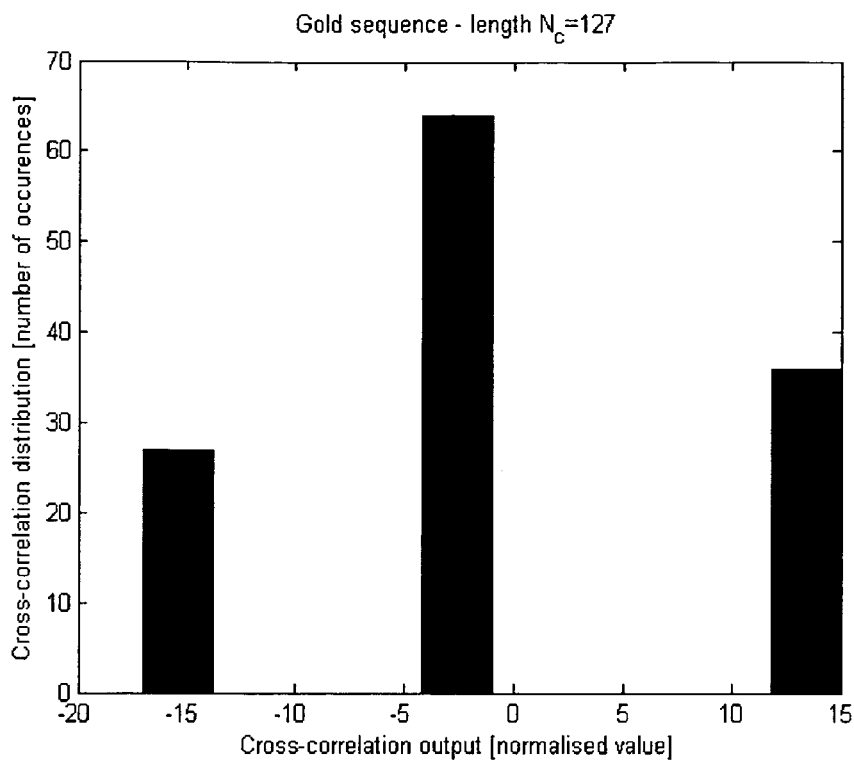
FIG. 1 is a plot of a cross-correlation value distribution of a Gold sequence with a length $N_c=127$.
Figure 2:
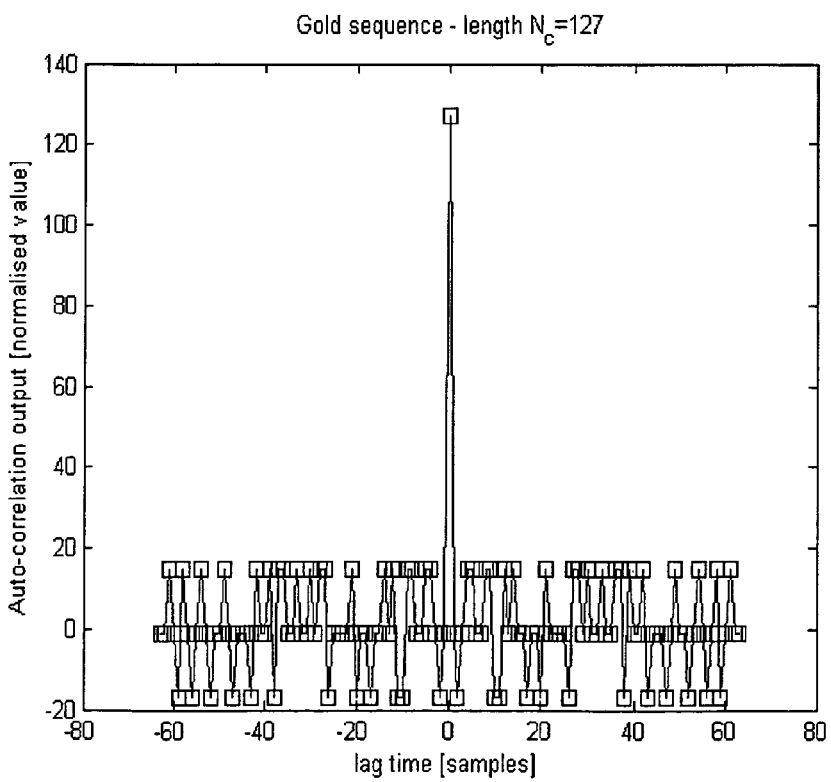
FIG. 2 is a plot of an auto-correlation function vs. lag time of a Gold sequence with a length $N_c=127$ (no noise)

Gold sequences have predictable 3-value cross-correlation properties. For example, for $N_c=63$, the three-value correlations are 15, −1, and −17, and for $N_c=127$, the three-value correlations are also 15, −1, and −17. The auto-correlation values for $N_c=63$ and $N_c=127$ are 63 and 127, respectively. Though the Gold sequence sets with $N_c=63$ and $N=127$ have the same cross-correlation peaks, the autocorrelation values of $N_c=127$ is double that of $N_c=63$. Typically, using $N_c=127$ instead of $N_c=63$ would improve Gold sequence detection by about 3 dB. FIGS. 1 and 2 show the cross-correlation distribution as a function of the cross-correlation value and an autocorrelation function as a function of the lag time without noise, respectively. Both FIGS. 1 and 2 are for the Gold sequence length of 127.

The cross-correlation distribution shown in FIG. 1 is obtained by cross-correlating one Gold sequence in the sequence set with another Gold sequence in the sequence set with cyclic-shifts in the range [−Nc/2, Nc/2], where Nc is the sequence length. The distribution, hence, corresponds to the number of occurrences of the cross-correlation output values, and shows that only three values are possible. FIG. 2 shows the autocorrelation for the Gold sequence length of 127 as a function of the lag time in samples. For a lag time of zero, the autocorrelation value is 127. If cross-correlation is used instead of autocorrelation at the lag time of zero, the cross-correlation of any sequence in the set with all other sequences in the set yields a correlation output equal to −1. It is noted that using even larger Gold sequence lengths (>127), if necessary, may provide even better detection performance for multiple pilot symbols.

Figure 3A:
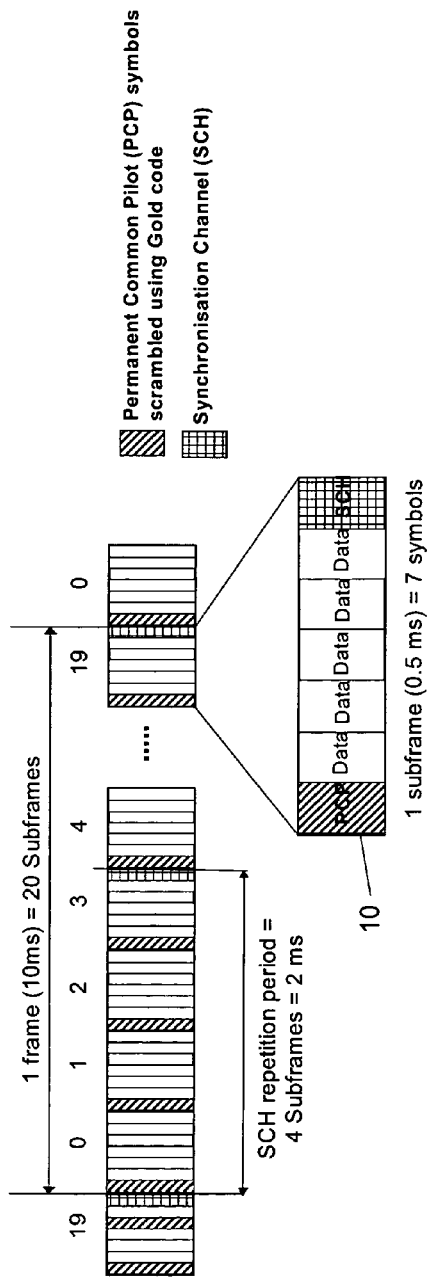
FIG. 3a is a schematic representation of a frame with a sub-frame having one permanent common pilot (PCP) scrambled using pseudo-noise (e.g., Gold) scrambling code, according to an embodiment of the present invention.

Furthermore, FIG. 3a shows an example among others of a schematic representation of a frame with a sub-frame having one permanent common pilot (PCP) 10 scrambled using Gold code (also called here as Gold scrambling code), according to an embodiment of the present invention. Similarly, FIG. 3b shows another example of a schematic representation of a frame with a sub-frame having two permanent common pilots 20 and 22, respectively, scrambled using Gold code, according to a further embodiment of the present invention.

Figure 3B:
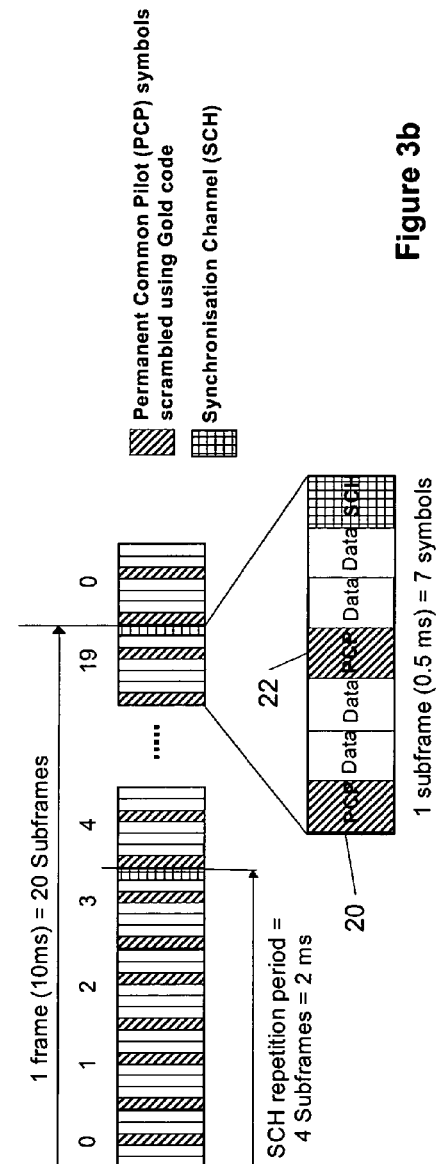
FIG. 3b is a schematic representation of a frame with a sub-frame having two permanent common pilots (PCP) scrambled using pseudo-noise (e.g., Gold) scrambling code, according to an embodiment of the present invention.

In the examples of FIGS. 3a and 3b, an SCH (synchronization channel) repetition period of four sub-frames is assumed. Two scenarios shown in FIGS. 3a and 3b have the following parameters:

FIG. 3a: PN, e.g., Gold sequence length $N_c$=63 maps to 4 pilot symbols during one SCH period which is, e.g., 2 ms (the frame period is 10 ms, the SCH period is 4 sub-frames); this example has approximately 3% pilot overhead, i.e., one sub-carrier allocated to pilot, followed by 4 sub-carriers allocated to data every 5 sub-carriers in the OFDM symbol, and one pilot symbol per sub-frame, so the pilot overhead is (1/5)*(1/7)= 2.85%; and FIG. 3b: PN, e.g., Gold sequence length $N_c$=127 maps to 8 pilot symbols during one SCH period which is, e.g., 2 ms (again, the frame period is 10 ms, the SCH period is 4 sub-frames); this example has approximately 6% pilot overhead, i.e., one sub-carrier allocated to pilot, followed by 4 sub-carriers allocated to data every 5 sub-carriers in the OFDM symbol, and two pilot symbols per sub-frame, so the pilot overhead is (1/5)*(2/7)=5.71%. Using two pilot symbols per sub-frame in FIG. 3b allows larger Gold sequence lengths.

It is noted that for the larger pilot density, larger PN (e.g., Gold codes) lengths can be used, which will allow to allocate more sub-carriers to pilots in the frequency domain, and more pilot symbols per sub-frame in the time domain.

The scrambling code for larger bandwidths (BW) can be broadcasted in system information or determined by one-to-one mapping between scrambling code detected, e.g., in 1.25 MHz and scrambling code used in larger BW. The scrambling code can be detected with a high detection probability. For example, in examples illustrated in FIGS. 3a and 3b, detection rates of 70% were observed in typical vehicular scenarios at SNR (signal-to-noise) as low as −5 dB.

Figure 4:
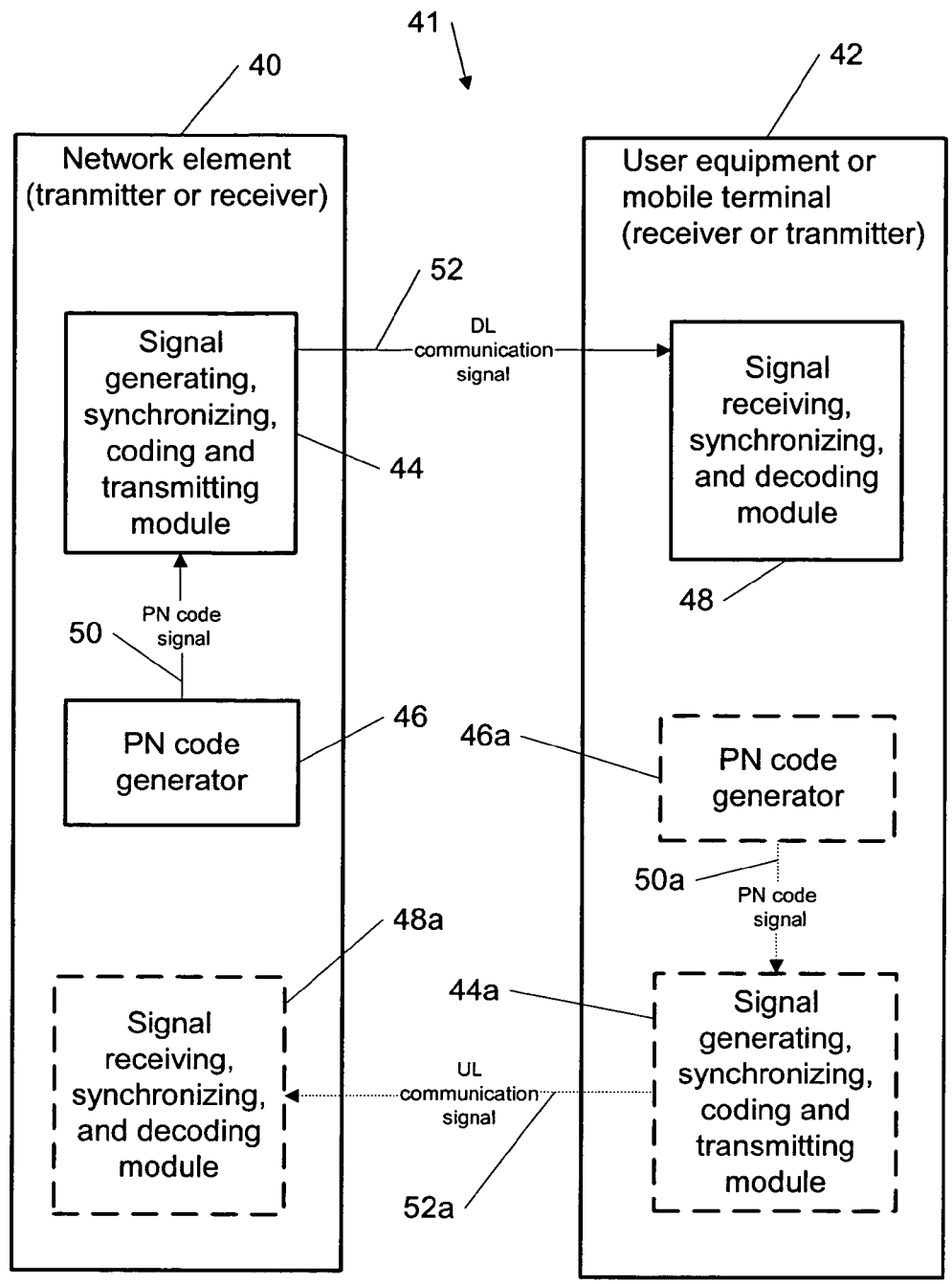
FIG. 4 is a block diagram of a mobile communication system with a pilot scrambling using a pseudo-noise scrambling code, according to an embodiment of the present invention.

FIG. 4 is an example among others of a block diagram of a mobile communication system 41 with the pilot scrambling using the Gold scrambling code, according to embodiments of the present invention.

In the example of FIG. 4, both a network element (e.g., Node B) 40 and a mobile station (or a user equipment) 42 can comprise similar components in order to facilitate a bi-directional transmission with the pilot scrambling using the PN (e.g., Gold) scrambling code, according to embodiments of the present invention, such that both the network element 40 or the user equipment 42 can be a transmitter or a receiver. These components are: a PN code generators 46 and 46a, signal generating/synchronizing/coding/transmitting modules 44 and 44a, and signal receiving/synchronizing/decoding modules 48 and 48a, respectively. In the context of the present invention, the mobile station (or the user equipment) 42 can be a wireless communication device, a portable device, a mobile communication device, a mobile phone, a mobile camera phone, etc. In the example of FIG. 4, a network element 40 can be, e.g., a Node B, RNC (radio network controller), a BTS (base transceiver station), etc. According to an embodiment of the present invention, in the case of the DL (or UL) communications, the PN code generator 46 (or 46a) can provide a PN code signal 50 (or 50a) comprising the PN (e.g., Gold) scrambling sequences to the module 44 (44a). Then the module 44 (44a) can generate a DL communication signal 52 (or the UL communication signal 52a) which comprises multiple pilot symbols scrambled using the PN (e.g., Gold) code, according to embodiments of the present invention. The signal receiving/synchronizing/decoding module 48 (or 48a) then can receive the communication signal 52 (or 52a) and decode the multiple pilot symbols using the PN (e.g., Gold) scrambling code. It is noted that in the example of FIG. 4, the functionally of identical module pairs 46 and 46a, 44 and 44a, 48 and 48a, facilitating the DL and UL communications according to the embodiments of the present invention, can have similar or different implementations.

According to an embodiment of present invention, the modules 46, 46a, 44, 44a, 48 and 48a can be implemented as a software module, a hardware module or a combination thereof. Furthermore, each of the modules 46, 46a, 44, 44a, 48 and 48a can be implemented as a separate module or can be combined with any other standard module/block of the mobile station 42 or the network element 40, or it can be split into several modules/blocks according to their functionality.

All or selected blocks and modules of the network element 40 can be implemented using an integrated circuit, and all or selected blocks of the user equipment 42 can be implemented using an integrated circuit as well.

Figure 5:
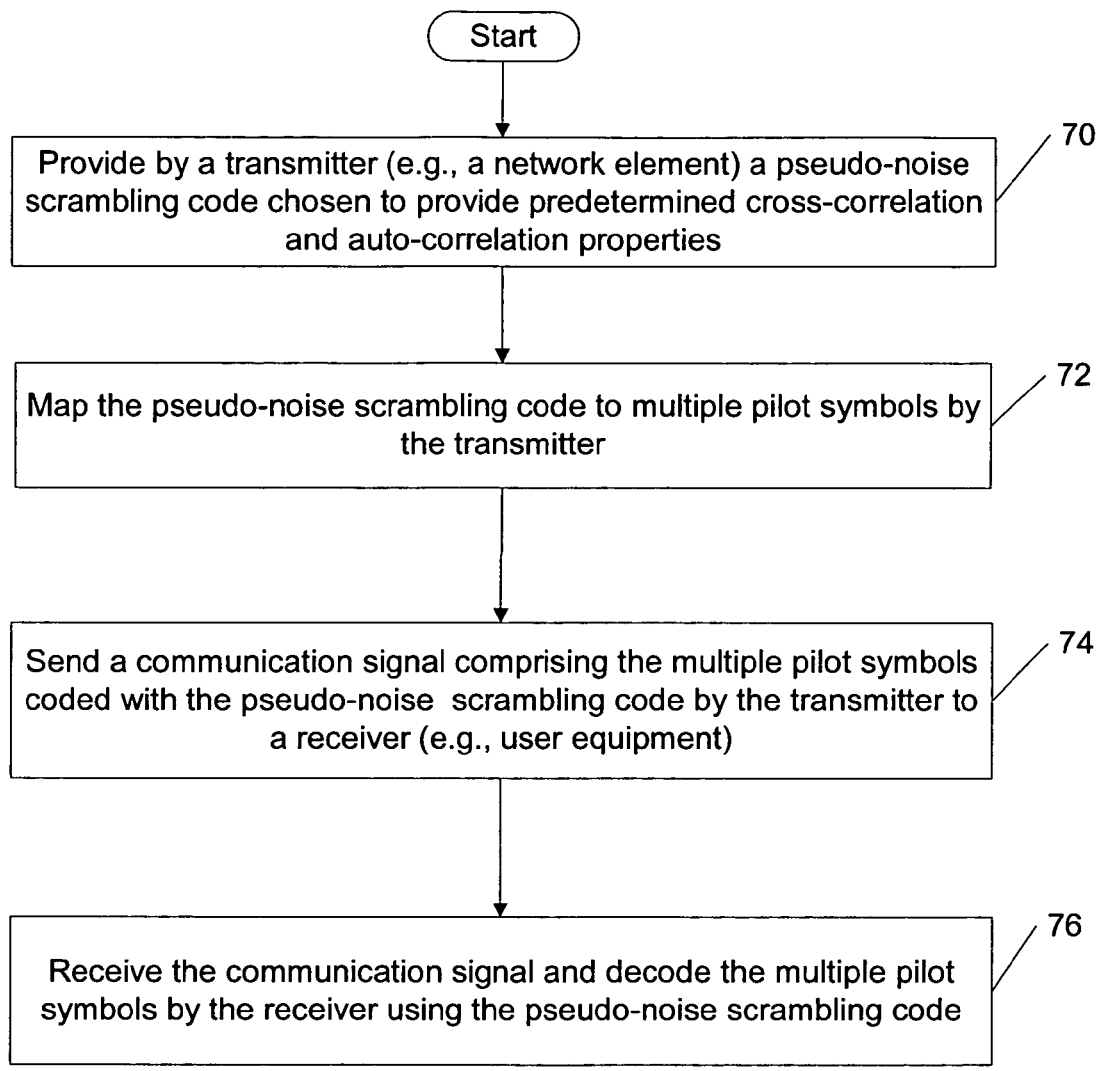
FIG. 5 is a flow chart demonstrating pilot scrambling using a pseudo-noise scrambling code, according to an embodiment of the present invention.

FIG. 5 is an example among others of a flow chart demonstrating pilot scrambling using a pseudo-noise scrambling code, according to an embodiment of the present invention.

The flow chart of FIG. 5 only represents one possible scenario among others. The order of steps shown in FIG. 5 is not absolutely required, so generally, the various steps can be performed out of order. In a method according to an embodiment of the present invention, in a first step 70, a transmitter (e.g., a network element such as Node B or a user equipment) generates a pseudo-noise scrambling code chosen to provide predetermined cross-correlation and auto-correlation properties. In a next step 72, the pseudo-noise scrambling code is mapped to multiple pilot symbols by the transmitter. In a next step 74, the transmitter sends a communication signal comprising the multiple pilot symbols coded with the pseudo-noise scrambling code to a receiver (e.g., user equipment or a network element such as Node B). In a next step 76, the communication signal is received and the multiple pilot symbols are decoded by the receiver with the pseudo-noise scrambling code.

The pilot scrambling detection described in different embodiments of the present invention (see FIGS. 1-5) can be typically done by means of practical DSP (digital signal processing) operations which are generally known to a person skilled in the art.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

It is noted that various embodiments of the present invention recited herein can be used separately, combined or selectively combined for specific applications.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
   providing a pseudo-noise scrambling code chosen to provide predetermined cross-correlation and auto-correlation properties;
   mapping said pseudo-noise scrambling code to multiple pilot symbols; and
   sending a communication signal comprising said multiple pilot symbols coded with said pseudo-noise scrambling code for decoding said multiple pilot symbols using said pseudo-noise scrambling code, wherein said multiple pilot symbols are for a channel estimation and wherein said pseudo-noise scrambling code is a Gold scrambling code.

2. The method of claim 1, wherein each sub-frame of the communication signal comprises at least one pilot symbol coded with said pseudo-noise scrambling code.

3. The method of claim 1, wherein each sub-frame of the communication signal comprises two pilot symbols coded with said pseudo-noise scrambling code.

4. The method of claim 1, wherein the Gold sequence of the Gold scrambling code has a length of 63 or 127.

5. The method of claim 1, wherein said pseudo-noise scrambling code is provided only for said multiple pilot symbols and not for any other symbols in said communication signal.

6. The method of claim 1, wherein said communication signal is sent downlink from a network element to said receiver in a user equipment or to a mobile station in a wireless communication system.

7. The method of claim 1, wherein said communication signal is sent uplink from a user equipment or a mobile station to said receiver in a network element in a wireless communication system.

8. A computer program product comprising: a non-transitory computer readable storage structure embodying computer program code thereon for execution by a computer processor with said computer program code, wherein said computer program code comprises instructions for performing the method of claim 1.

9. The method of claim 1, wherein said channel estimation is for at least one of a tight-frequency re-use application, an orthogonal frequency division multiplexing application, and improving performance on a sector or cell edge.

10. An apparatus, comprising:
    at least one processor; and
    at least one computer readable storage structure including computer program code, the at least one computer readable storage structure and the computer program code configured to, with the at least one processor, cause the apparatus at least to:
    provide a pseudo-noise code signal comprising a pseudo-noise scrambling code chosen to provide predetermined cross-correlation and auto-correlation properties; and
    map said pseudo-noise scrambling code to multiple pilot symbols and send a communication signal comprising said multiple pilot symbols coded with said pseudo-noise scrambling code to a receiver for decoding, wherein said multiple pilot symbols are for a channel estimation wherein said pseudo-noise scrambling code is a Gold scrambling code.

11. The apparatus of claim 10, wherein said apparatus is a Node B and said receiver is a user equipment configured for wireless communications, wherein said communication signal is sent from said Node B to said user equipment on a downlink.

12. The apparatus of claim 11, wherein said channel estimation is for at least one of: a tight-frequency re-use application, an orthogonal frequency division multiplexing application, and improving performance on a sector or cell edge.

13. The apparatus of claim 10, wherein said apparatus is a user equipment and said receiver is a Node B configured for wireless communications, wherein said communication signal is sent from said user equipment to said Node B on an uplink.

14. The apparatus of claim 10, wherein each sub-frame of the communication signal comprises at least one pilot symbol coded with said pseudo-noise scrambling code.

15. The apparatus of claim 10, wherein each sub-frame of the communication signal comprises two coded pilot symbols coded with said pseudo-noise scrambling code.

16. The apparatus of claim 10, wherein the Gold sequence of the Gold scrambling code has a length of 63 or 127.

17. The apparatus of claim 10, wherein said pseudo-noise scrambling code is provided only for said multiple pilot symbols and not for any other symbols in said communication signal.

18. The apparatus of claim 10, wherein said apparatus is an integrated circuit.

19. An apparatus, comprising:
    at least one processor; and
    at least one computer readable storage structure including computer program code, the at least one computer readable storage structure and the computer program code configured to, with the at least one processor, cause the apparatus at least to:
    receive and decode a communication signal comprising multiple pilot symbols using a pseudo-noise scrambling code, wherein
    said multiple pilot symbols are coded using a pseudo-noise code signal comprising said pseudo-noise scrambling code chosen to provide predetermined cross-correlation and auto-correlation properties by a transmitter and said pseudo-noise scrambling code is further mapped to said multiple pilot symbols by said transmitter for providing said communication signal to said apparatus, wherein said multiple pilot symbols are for a channel estimation and wherein said pseudo-noise scrambling code is a Gold code.

20. The apparatus of claim 19, wherein an integrated circuit comprises the signal receiving/synchronizing/decoding module.

21. An apparatus, comprising:
    means for providing a pseudo-noise code signal comprising a pseudo-noise scrambling code that provides selected cross-correlation and auto-correlation properties; and means for mapping said pseudo-noise scrambling code to multiple pilot symbols and sending a communication signal comprising said multiple pilot symbols coded with said pseudo-noise scrambling code to a receiver, wherein said receiver is configured for receiving said communication signal and decoding said multiple pilot symbols using said pseudo-noise scrambling code, wherein said multiple pilot symbols are for a channel estimation wherein said pseudo-noise scrambling code is a Gold code.

22. A method, comprising:

receiving and decoding a communication signal comprising multiple pilot symbols using a pseudo-noise scrambling code, wherein said multiple pilot symbols are coded using a pseudo-noise code signal comprising said pseudo-noise scrambling code chosen to provide predetermined cross-correlation and auto-correlation properties and said pseudo-noise scrambling code is further mapped to said multiple pilot symbols for providing said communication signal, wherein said multiple pilot symbols are for a channel estimation wherein said pseudo-noise scrambling code is a Gold code.

23. Apparatus, comprising:

means for receiving and decoding a communication signal comprising multiple pilot symbols using a pseudo-noise scrambling code, and means for coding said multiple pilot symbols using a pseudo-noise code signal comprising said pseudo-noise scrambling code chosen to provide predetermined cross-correlation and auto-correlation properties and said pseudo-noise scrambling code is further mapped to said multiple pilot symbols for providing said communication signal, wherein said multiple pilot symbols are for a channel estimation wherein said pseudo-noise scrambling code is a Gold code.

* * * * *